(12) United States Patent  
Lawther et al.

(10) Patent No.: US 6,304,722 B1  
(45) Date of Patent: Oct. 16, 2001

(54) ONE-TIME USE CAMERA WITH FILM WINDING DETECTION TO ENABLE EXPOSURE-RELATED COMPONENT

(75) Inventors: Joel S. Lawther, East Rochester; Gregory J. Lukins, Rochester; Roger A. Fields, Pittsford, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/480,898

(22) Filed: Jan. 11, 2000

(51) Int. Cl.[7] ............................ G03B 17/02; G03B 17/26; G03B 7/26
(52) U.S. Cl. ............................ 396/6; 396/205; 396/302; 396/512
(58) Field of Search ..................... 396/6, 205, 301, 396/302, 387, 408, 511, 512, 515

(56) References Cited

U.S. PATENT DOCUMENTS

| | | |
|---|---|---|
| Re. 35,817 | 6/1998 | Zander . |
| 4,340,286 | 7/1982 | Carr . |
| 4,490,027 | 12/1984 | Frank et al. . |
| 4,806,960 * | 2/1989 | Momot et al. ................. 396/511 |
| 5,003,333 * | 3/1991 | Earnhart ......................... 396/511 |
| 5,258,789 | 11/1993 | Labaziewicz . |
| 5,349,410 | 9/1994 | Kamata . |
| 5,761,542 | 6/1998 | Lamphron et al. . |
| 5,799,218 | 8/1998 | Aoki . |
| 5,809,358 | 9/1998 | Weber . |
| 5,815,740 | 9/1998 | Wagner . |
| 6,195,506 * | 2/2001 | Yamazaki et al. ............. 396/6 |

* cited by examiner

Primary Examiner—Alan A. Mathews  
(74) Attorney, Agent, or Firm—Roger A. Fields (57) ABSTRACT

A one-time use camera comprising a filmstrip having successive frames including first- and last-to-be-exposed frames and a pre-exposure frame immediately preceding the first-to-be-exposed frame, a backframe opening at which the respective frames of the filmstrip beginning with the first-to-be exposed frame and ending with the last-to-be-exposed frame are exposed during picture-taking, a film cartridge which contains a film take-up spool that is manually rotated decreasing angles of rotation to wind the respective frames of the filmstrip beginning with the pre-exposure frame from the backframe opening onto said spool, and an exposure-related component that must be enabled in order to operate, is characterized in that a rotation-sensing detector for sensing rotation of the spool is connected with the exposure-related component to enable the exposure-related component when the spool is rotated an angle of rotation no greater than an angle sufficient to wind the last-to-be exposed frame onto the spool, whereby the exposure-related component can be enabled each time the spool is rotated to wind one of the frames of the filmstrip onto the spool.

18 Claims, 9 Drawing Sheets

ONE-TIME USE CAMERA WITH FILM WINDING DETECTION TO ENABLE EXPOSURE-RELATED COMPONENT

FIELD OF THE INVENTION

The invention relates generally to the field of photography, and in particular to cameras. More specifically, the invention relates to a one-time-use camera that detects film winding substantially a frame increment to enable an exposure-related component such as an electronic flash or an electronic shutter.

BACKGROUND OF THE INVENTION

Film and cameras that are all in one, commonly referred to as single-use or one-time-use cameras, have become well known. The one-time-use camera is a simple point-and-shoot type comprising an opaque plastic main body part that supports a conventional film cartridge in a cartridge receiving chamber, an unexposed filmstrip substantially prewound from a film take-up spool in the film cartridge onto a film supply spool in a film supply chamber in order to form an unexposed film roll on the film supply spool, a fixed-focus taking lens, a film metering mechanism with a rotatably supported metering sprocket that engages the filmstrip, a manually rotatable film winding thumbwheel coaxially engaged with the film take-up spool in the film cartridge, a single-blade shutter for exposing successive frames of the filmstrip, a manually depressible shutter release button, a rotatable frame counter for indicating the number of exposures remaining to be made on the filmstrip, a direct see-through viewfinder having front and rear viewfinder lenses, and in some models an electronic flash. A pair of opaque plastic front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

After each picture is taken with the one-time-use camera, the photographer manually rotates the thumbwheel in a film winding direction to similarly rotate the film take-up spool in the film cartridge. This winds an exposed frame of the filmstrip from a rear backframe (exposure) opening in the main body part into the film cartridge, and advances an unexposed frame of the filmstrip from the unexposed film roll to the backframe opening. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel. When the metering lever engages the thumbwheel, further rotation of the thumbwheel is prevented. Manually depressing the shutter release button to take another picture pivots the metering lever out of engagement with the thumbwheel to permit renewed rotation of the thumbwheel. After the maximum number of exposures available on the filmstrip have been made, and the filmstrip is completely wound into the film cartridge, the one-time-use camera is given to a photofinisher who separates the rear cover part from the main body part and removes the film cartridge with the exposed filmstrip from the cartridge receiving chamber. Then, he removes the exposed filmstrip from the film cartridge to develop the negatives and make prints for the customer. Most of the used parts such as the electronic flash can be recycled, i.e. reused, to remanufacture the one-time-use camera.

PRIOR ART PROBLEM

There is a known problem in the recycling in that the used parts may become worn or damaged, and in that case should not be reused to remanufacture the one-time-use camera.

Thus, it has been suggested that any worn or damaged parts be purposely fractured to render them visibly different during disassembly of the one-time-use camera to retrieve the exposed film. This allows the worn or damaged parts to be readily identified to be discarded, and prevents them from being erroneously reused. This is described, for example, in prior art U.S. Pat. No. 5,349,410 issued Sep. 20, 1994, U.S. Pat. No. 5,761,542 issued Jun. 2, 1998, and U.S. Pat. No. 5,815,740 issued Sep. 29, 1998.

Another suggestion disclosed in prior art U.S. Pat. No. Re. 35,817 issued Jun. 2, 1998 intends that the disassembled camera be returned to the original manufacturer in order to assure that the remanufactured camera does not suffer any loss in quality. The patent proposes to disable some main function component of the one-time-use camera such as the electronic flash, when the frame counter indicates that the maximum number of exposures available on the filmstrip have been made. Preferably, an IC (integrated circuit) chip interrogates the frame counter after each exposure to disable a flash charger circuit in the electronic flash when the frame counter is decremented to "0". The original manufacturer then must input a reset code to the IC chip to re-enable the flash charger circuit. This permits the electronic flash to be reused in a remanufactured camera.

If the electronic flash has become worn, it should not be reused. However, one might possibly short-circuit, i.e. bypass, the IC chip or remove the IC chip in an attempt to reuse the worn flash unit. This should be discouraged by making the electronic flash tamper resistant.

SUMMARY OF THE INVENTION

A one-time use camera comprising a filmstrip having successive frames including first- and last-to-be-exposed frames and a pre-exposure frame immediately preceding the first-to-be-exposed frame, a backframe opening at which the respective frames of the filmstrip beginning with the first-to-be exposed frame and ending with the last-to-be-exposed frame are exposed during picture-taking, a film cartridge which contains a film take-up spool that is manually rotated decreasing angles of rotation to wind the respective frames of the filmstrip beginning with the pre-exposure frame from the backframe opening onto said spool, and an exposure-related component that must be enabled in order to operate, is characterized in that:

a rotation-sensing detector for sensing rotation of the spool is connected with the exposure-related component to enable the exposure-related component when the spool is rotated an angle of rotation no greater than an angle sufficient to wind the last-to-be exposed frame onto the spool, whereby the exposure-related component can be enabled each time the spool is rotated to wind one of the frames of the filmstrip onto the spool.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Preferred Embodiment (FIGS. 1–8)

Referring now to the drawings, FIGS. 1–4 show a one-time-use camera 10. The one-time-use camera 10 includes a plastic opaque main body part 12, a plastic opaque front cover part 14, and a plastic opaque rear cover part 16. The front cover part 14 and the rear cover part 16 house the main body part 12 between them and are connected releasably to one another and to the main body part 12 via known flexible hook-in-hole connections 18.

Figure 7:
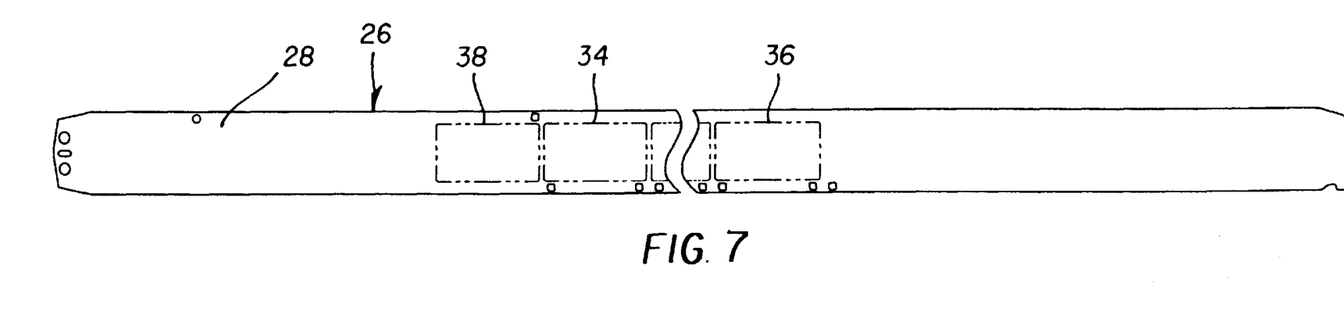
FIG. 7 is a plan view of a filmstrip.

As is typical, the main body part 12 has a rearwardly open cartridge receiving chamber 20 for a film cartridge 22 and a rearwardly open film supply chamber 24 for an unexposed filmstrip 26. See FIGS. 1, 2, 4 and 7. The unexposed filmstrip 26, except for a trailing end portion 28 originally wound on a film take-up spool 30 in the film cartridge 22, is substantially pre-wound into an unexposed film roll 32 in the film supply chamber 24 during manufacture of the one-time-use camera 10. As shown in FIG. 7, the filmstrip 26 has successive frames including first- and last-to-be exposed frames 34 and 36 and a pre-exposure frame 38 immediately preceding the first-to-be-exposed frame. The trailing film end portion 28 on the film take-up spool 30 is several frame widths. A rearwardly open, rectangular-shaped backframe (exposure) opening 40 is located intermediate the cartridge receiving chamber 20 and the film supply chamber 24 for exposing the respective frames of the filmstrip 26 beginning with the first-to-be-exposed frame 34 and ending with the last-to-be-exposed frame 36 when ambient light is received through a front taking lens 42 on the main body part 12. See FIGS. 1–4. This is typical in one-time-use cameras.

A manual film winder or film winding thumbwheel 44, rotatably supported on the main body part 12, above the cartridge receiving chamber 20, radially protrudes partially from an elongate narrow opening 46 in the rear cover part 16 and has a depending coaxial stem (not shown) in coaxial engagement with an exposed top end 48 of the film take-up spool 30 in the film cartridge 22. The film winding thumbwheel 44 is manually grasped or fingered to rotate the thumbwheel in a film winding direction 50, i.e. counter-clockwise in FIGS. 1, 2 and 4, to rotate the film take-up spool 30 in the same direction. The thumbwheel 44 is incrementally rotated decreasing angles of rotation to incrementally rotate the film take-up spool 30 the same decreasing angles in order to wind the respective frames of the filmstrip 26 beginning with the pre-exposure frame 38 from the backframe opening 40 onto the film take-up spool. The film take-up spool 30 must be rotated the decreasing angles to wind the respective frames onto the spool, because the resulting film roll (not shown) on the spool increases in diameter with each added frame. This is known in one-time-use cameras.

When the pre-exposure frame 38 is wound from the backframe opening 40 onto the film take-up spool 30, the first-to-be-exposed frame 34 is advanced from the unexposed film roll 32 to the backframe opening to be positioned for the first exposure. After the first exposure is made on the first-to-be exposed frame 34, that frame is wound onto the film take-up spool 30 and the next-to-be-exposed frame (not shown) is advanced from the unexposed film roll 32 to the backframe opening 40 to be positioned for the second exposure. This cycle continues until the entire length of the filmstrip 26 including the last-to-be-exposed frame 36 is wound onto the film take-up spool 30 following the last exposure.

The thumbwheel 44 and the film take-up spool 30 are rotated a so-called "maximum" or greatest angle of rotation to wind the pre-exposure frame 38 from the backframe opening 40 onto the spool, and they are rotated a substantially decreased "minimum" angle of rotation to wind the last-to-be exposed frame 36 from the backframe opening onto the spool. If the filmstrip 26 has 40 frames available for exposure, the "maximum" angle necessary to wind the pre-exposure frame 38 from the backframe opening 40 onto the take-up spool 30 (and to advance the first-to-be-exposed frame 34 from the unexposed film roll 32 to the backframe opening) is about 407°, and the "minimum" angle necessary to wind the last-to-be exposed frame 36 from the backframe opening onto the spool is about 220°. If the filmstrip 26 has 25 frames available for exposure, the "maximum" angle necessary to wind the pre-exposure frame 38 from the backframe opening 40 onto the take-up spool 30 (and to advance the first-to-be-exposed frame 34 from the unexposed film roll 32 to the backframe opening) could remain about 407°, but the "minimum" angle necessary to wind the last-to-be exposed frame 36 from the backframe opening onto the spool would be about 263°. This assumes there is no change in the diameter of the film take-up spool 30.

The following table lists the approximate decreasing angles of rotation to wind the frames of the filmstrip 26 onto the film take-up spool 30. The tables is for a 40-frame filmstrip, and begins with the maximum angle to wind the pre-exposure frame 38 onto the spool 30 and ends with the minimum angle to wind the last-to-be-exposed frame 36 onto the spool.

| Successive frames | No. | Decreasing angles of rotatation (in °) |
| --- | --- | --- |
| Pre-exposure frame 38 | 0 | 407 |
| First to-be-exposed frame 34 | 1 | 396 |
| | 2 | 385 |
| | 3 | 378 |

-continued

| Successive frames | No. | Decreasing angles of rotatation (in °) |
|---|---|---|
| | 4 | 367 |
| | 5 | 360 |
| | 6 | 284 |
| | 7 | 342 |
| | 8 | 335 |
| | 9 | 328 |
| | 10 | 320 |
| | 11 | 317 |
| | 12 | 310 |
| | 13 | 310 |
| | 14 | 302 |
| | 15 | 299 |
| | 16 | 295 |
| | 17 | 288 |
| | 18 | 284 |
| | 19 | 281 |
| | 20 | 277 |
| | 21 | 274 |
| | 22 | 270 |
| | 23 | 266 |
| | 24 | 266 |
| | 25 | 263 |
| | 26 | 259 |
| | 27 | 256 |
| | 28 | 252 |
| | 29 | 245 |
| | 30 | 245 |
| | 31 | 241 |
| | 32 | 241 |
| | 33 | 238 |
| | 34 | 238 |
| | 35 | 234 |
| | 36 | 230 |
| | 37 | 230 |
| | 38 | 227 |
| | 39 | 223 |
| Last-to-be-exposed frame 36 | 40 | 220 |

Figure 1:
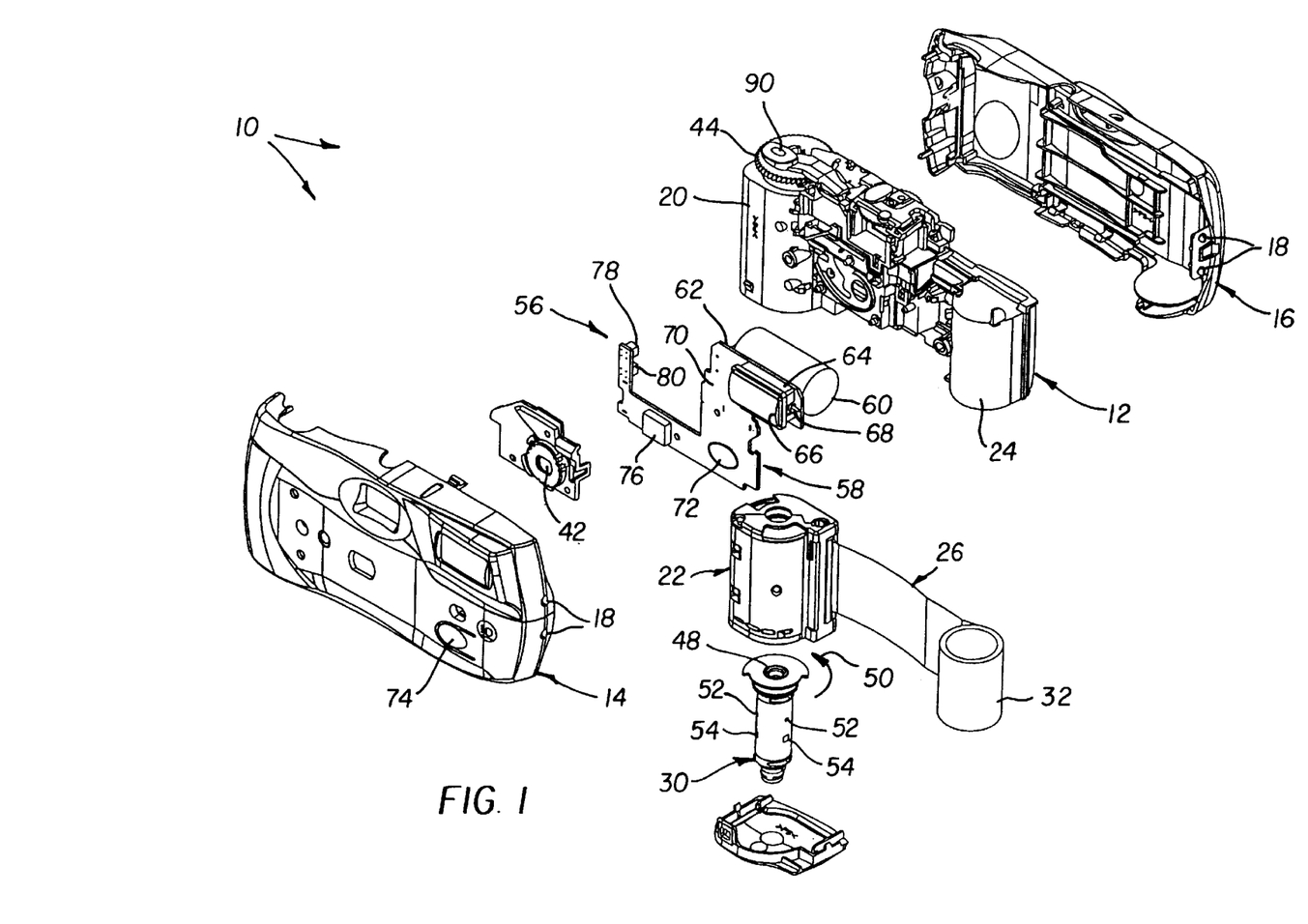
FIG. 1 is an exploded front perspective view of a one-time-use-camera which is a preferred embodiment of the invention.
Figure 2:
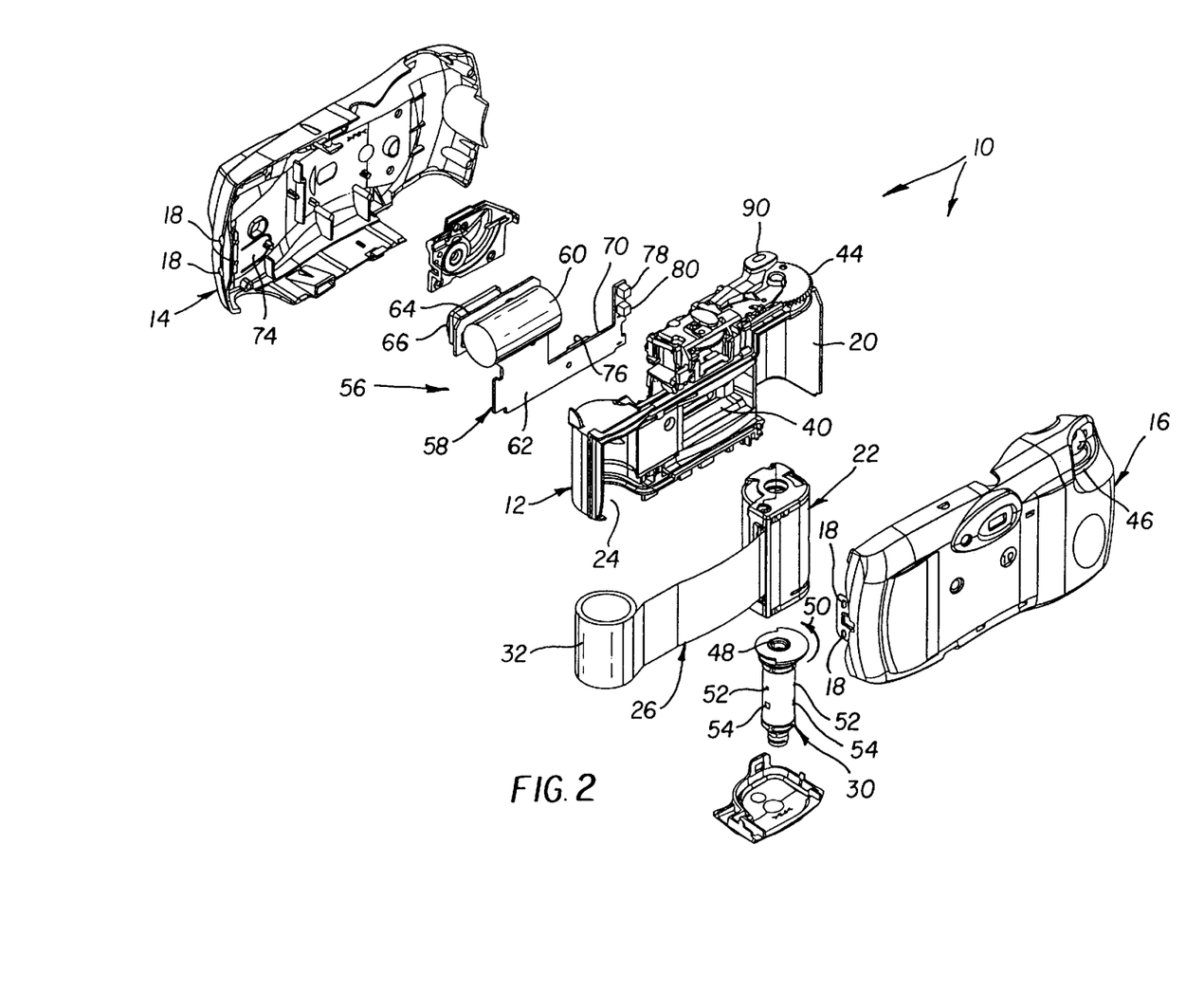
FIG. 2 is an exploded rear perspective view of the camera.
Figure 3:
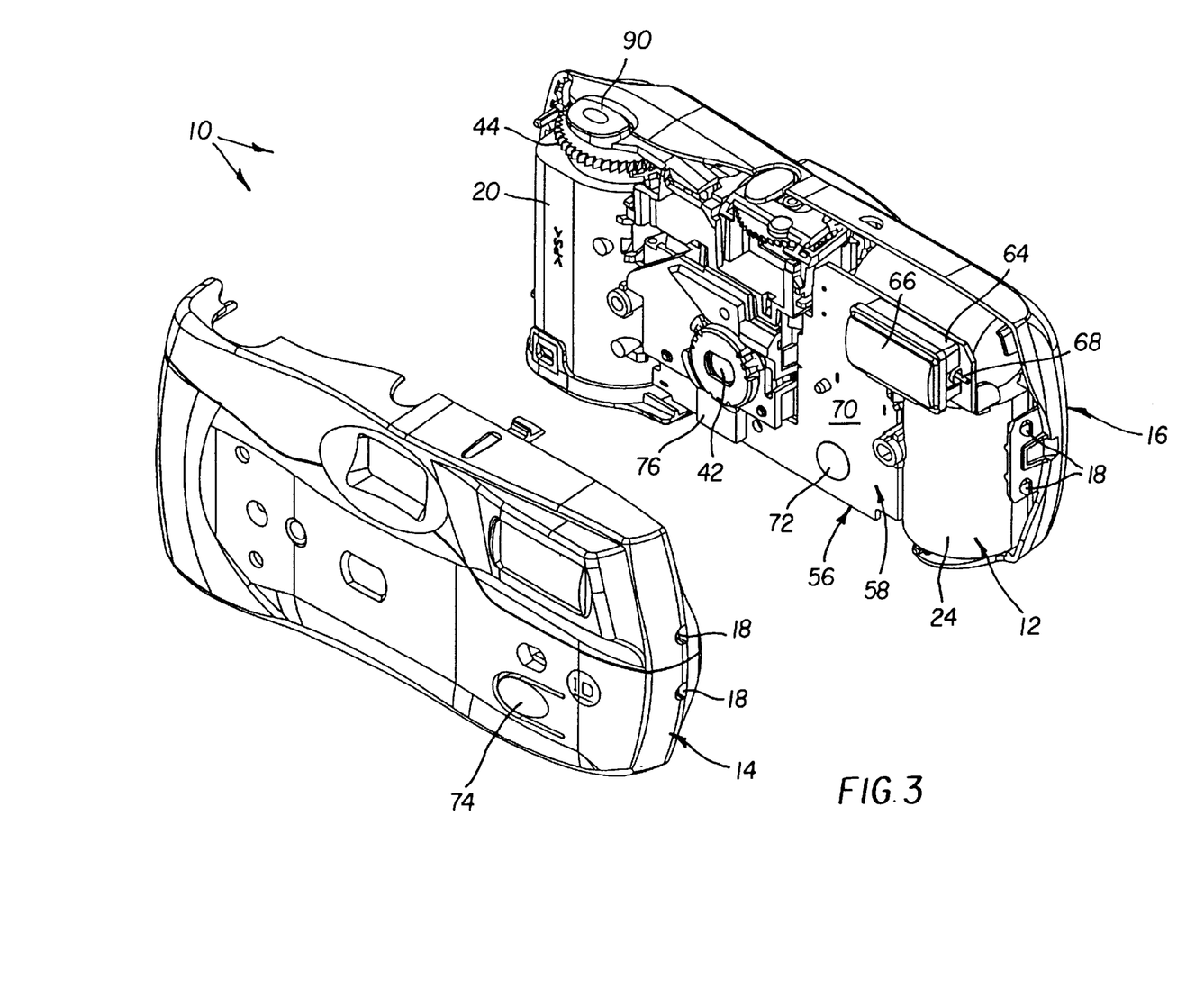
FIG. 3 is a partially assembled front perspective view of the camera.
Figure 4:
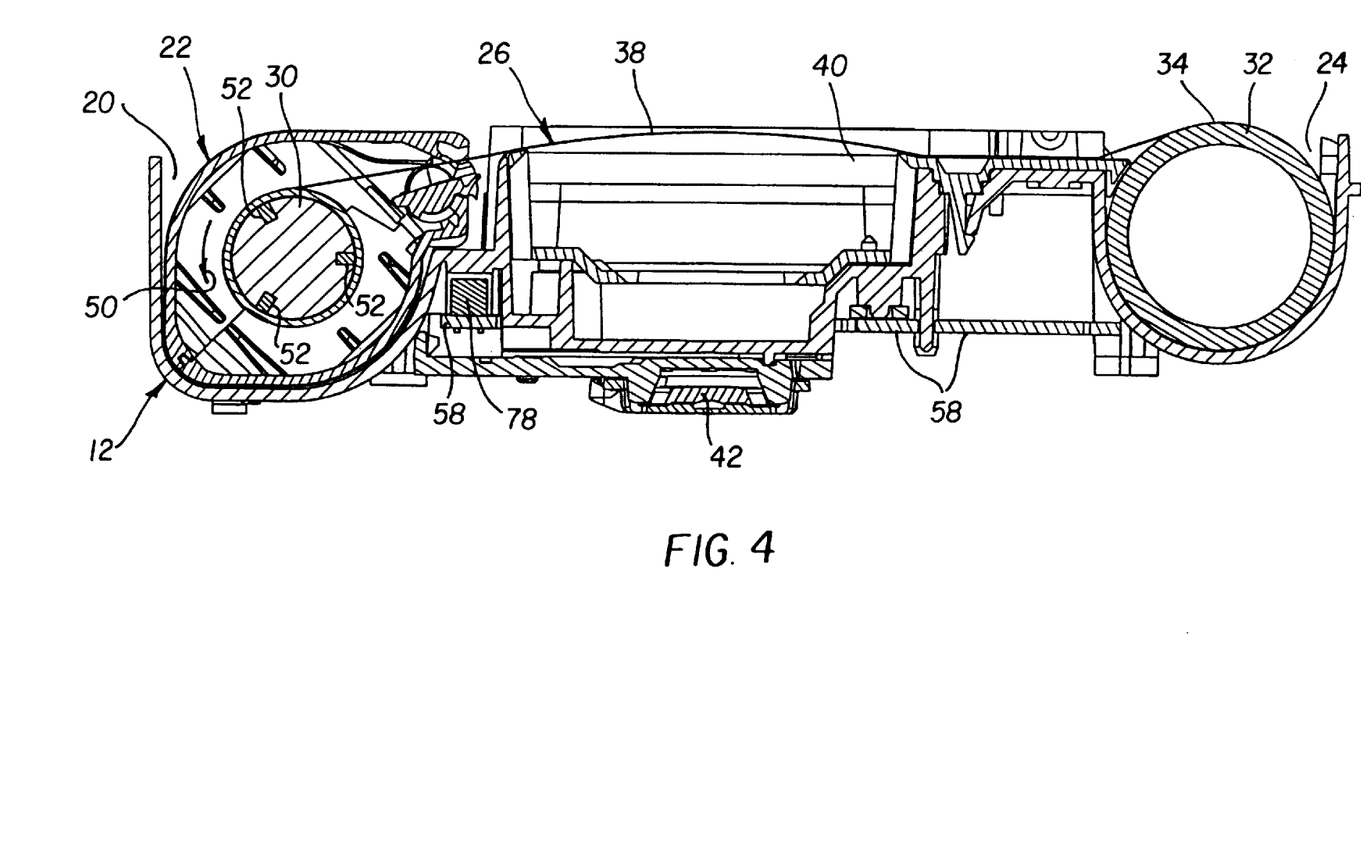
FIG. 4 is a plan section view of the camera, partly in section.
Figure 5:
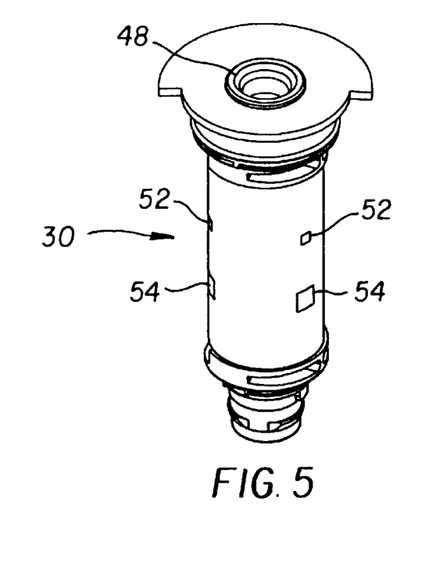
FIG. 5 is a perspective view of a rotatable film take-up spool.
Figure 6:
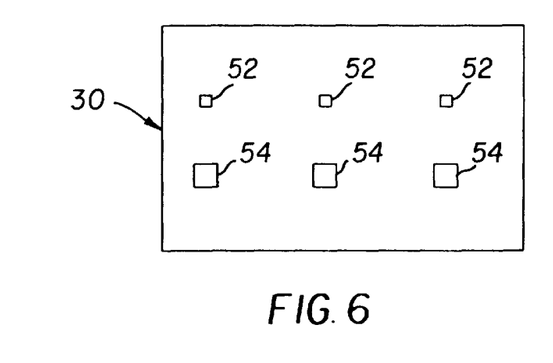
FIG. 6 is a flattened out view of the film take-up spool which is shown flattened out to indicate the spacing of two rows of magnetic segments (inserts) on the spool.

The film take-spool 30 includes upper and lower parallel rows of three smaller and three larger magnetic detectable segments (inserts) 52 and 54. See FIGS. 1, 2 and 4–6. The three upper smaller magnetic segments 52 are spaced 120° apart from one another, and the three lower larger magnetic segments 54 are spaced apart from one another, as depicted in FIG. 6. The film take-up spool 30 can be encapsulated to prevent any one of the magnetic segments 52 and 54 from separating from the spool.

An electronic flash 56 includes a flat flash circuit board 58 that supports a flash capacitor 60 on its rear side 62. See FIGS. 1, 2 and 4. A flash reflector 64 and a flash cover lens 66 house a flash tube 68 between them and are supported on a front side 70 of the flash circuit board 58. A resilient depressible flash charge or "on" button 72 on the front side 70 of the flash circuit board 58 is depressed to charge the electronic flash 56 from an "off" state to an "on" state when a resilient cantilevered button 74 on the front cover part 14 is manually depressed. A known microcomputer or IC chip 76 is mounted on the front side 70 of the flash circuit board 58. The microcomputer 76, when not being used, automatically returns from an "on" or "active" mode to a normal "doze" mode which draws very little power from a battery (not shown) for the electronic flash 56. A rotation-sensing detector which is a pair of fixed upper and lower magnet detectors 78 and 80 is supported on the rear side 62 of the flash circuit board 58. The upper magnet detector 78 is positioned to sense the upper smaller magnetic segments 52 one at a time, and the lower magnet detector 80 is positioned to sense the lower larger magnetic segments 54 one at a time, when the film take-up spool 30 is rotated in the film winding direction 50 via the thumbwheel 44 the various angles of rotation. Each time the upper magnet detector 78 senses one of the upper smaller magnetic segments 52, it provides a corresponding input to the microcomputer 76 which registers that input as a "X" value. Each time the lower magnet detector 80 senses one of the lower larger magnetic segments 54, it provides a corresponding input to the microcomputer 76 which registers that input as a "Y" value. These "X" and "Y" values are used for the microcomputer 76 to enable the electronic flash 56. The flash circuit board 58 including the microcomputer 76 and the upper and lower magnet detectors 78 and 80 are encapsulated.

Operation

Figure 8:
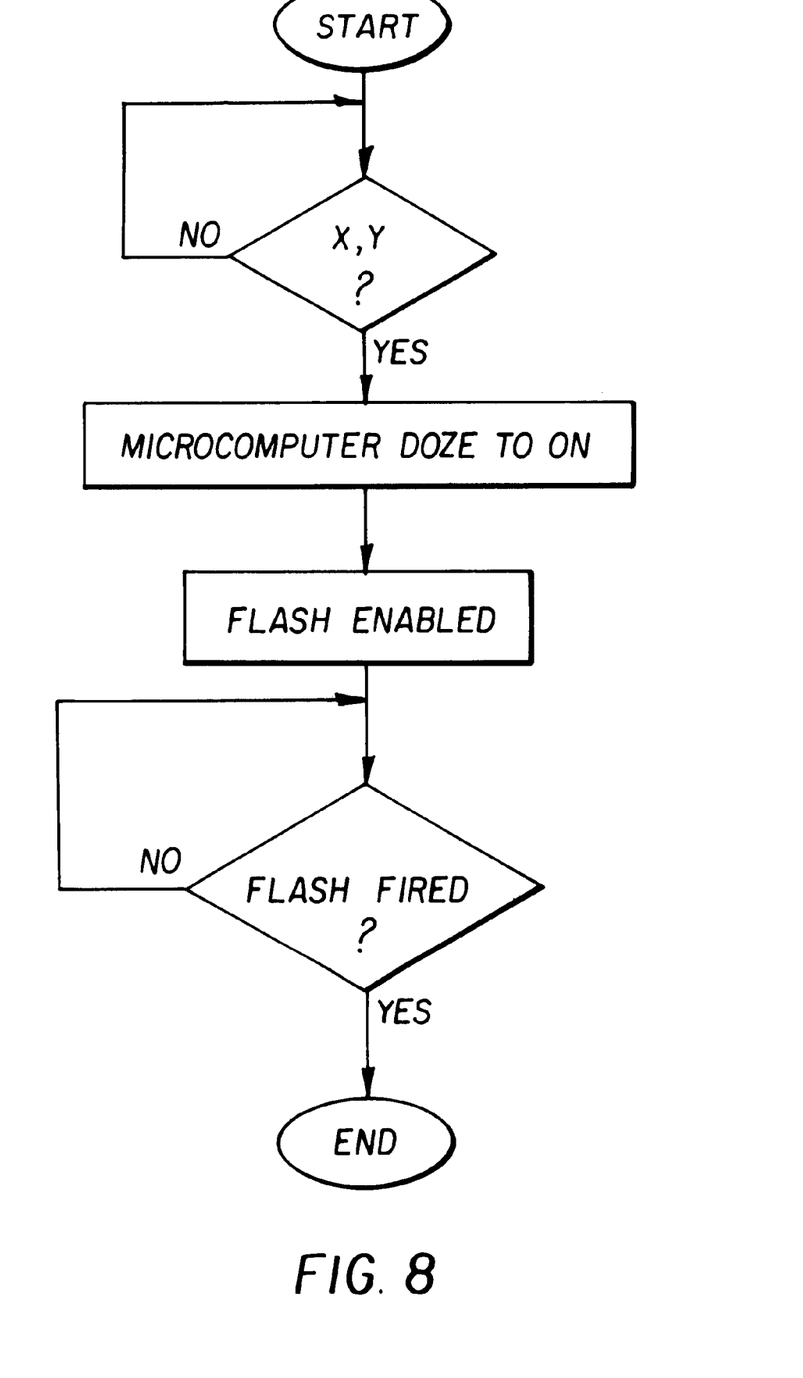
FIG. 8 is a flow chart.

A flow chart depicting a method of enabling the electronic flash 56 is shown in FIG. 8. In this instance, the filmstrip 26 has 40 frames available for exposure.

When the film take-up spool 30 is rotated in the film winding direction 50 via the thumbwheel 44, and the upper magnet detector 78 senses a first one of the upper smaller magnetic segments 52, the upper magnet detector provides a first input to the microcomputer 76 which registers that input as a "X" value. Simultaneously, the lower magnet detector 80 senses a first one of the lower larger magnetic segments 54, and it provides a first input to the microcomputer 76 which registers that input as a "Y" value.

The microcomputer 76 then changes from its normal "doze" mode to its "on" or "active" mode, and enables the electronic flash 56.

When the microcomputer 76 enables the electronic flash 56, the film take-up spool 30 has been rotated an angle of rotation that cannot be greater than (i.e. it actually is substantially less than) the "minimum" angle necessary to wind the last-to-be exposed frame 36 onto the spool, because the upper magnet detector 78 has sensed only a first one of the three upper smaller magnetic segments 52 and the lower magnet detector 80 has sensed only a first one of the three lower larger magnetic segments 54. The "minimum" angle is 220°, and the angle of rotation necessary for the respective magnet detectors 78 and 80 to sense the first ones of the three magnetic segments 52 and 54 cannot be more than 120°. (The angle of rotation necessary for the respective magnet detectors 78 and 80 to sense the first ones of the three magnetic segments 52 and 54 varies in accordance with the relative positions of the magnet detectors 78 and 80 and the first ones of the magnetic segments 52 and 54 at the start of rotation of the film take-up spool 30 in the film winding direction 50.) Thus, the film take-up spool 30 needs to be further rotated in the film winding direction 50 via the thumbwheel 44 to position the next-to-be-exposed frame of the filmstrip 26 at the backframe opening 40. The respective magnet detectors 78 and 80 will then sense further ones of the three magnetic segments 52 and 54, but this has no affect on the electronic flash 56 (which is already enabled).

If the microcomputer 76 determines that the flash charge or "on" button 72 on the flash circuit board 58 has been depressed to change the electronic flash 56 from its "off" state to an "on" state (because the resilient cantilevered button 74 on the front cover part 14 has been manually depressed), the flash tube 68 is fired (ignited) when a known shutter-flash synchronization switch (not shown) is closed. The electronic flash 56 is thereby disabled. If the microcomputer 76 determines that the flash charge or "on" button 72 on the flash circuit board 58 is not depressed to change the electronic flash 56 from the "off" state to the "on" state, the microcomputer returns to its "doze" mode which disables the electronic flash 56.

If the filmstrip 26 has 25 frames available for exposure, instead of 40 frames, the flow chart would differ as follows.

When the microcomputer 76 changes from its normal "doze" mode to its "on" or "active" mode, the electronic flash 56 is not yet enabled. The film take-up spool 30 then is further rotated in the film winding direction 50 via the thumbwheel 44, and the upper magnet detector 78 senses a second one of the upper smaller magnetic segments 52 to provide a second input to the microcomputer 76 which registers that input as a "X" value. Simultaneously, the lower magnet detector 80 senses a second one of the lower larger magnetic segments 54 to provide a second input to the microcomputer 76 which registers that input as the "Y" value. The microcomputer 76 then enables the electronic flash 56.

When the microcomputer 76 enables the electronic flash 56, the film take-up spool 30 has been rotated an angle of rotation that cannot be greater than (i.e. it is actually less than) the "minimum" angle necessary to wind the last-to-be exposed frame 36 onto the spool, because the upper magnet detector 78 has sensed only two of the three upper smaller magnetic segments 52 and the lower magnet detector 80 has sensed only two of the three lower larger magnetic segments 54. The "minimum" angle is 263°, and the angle of rotation necessary for the respective magnet detectors 78 and 80 to sense two of the three magnetic segments 52 and 54 cannot be more than 240°. (The angle of rotation necessary for the respective magnet detectors 78 and 80 to sense two of the three magnetic segments 52 and 54 varies in accordance with the relative positions of the magnet detectors and the magnetic segments at the start of rotation of the film take-up spool 30 in the film winding direction 50.) Thus, the film take-up spool 30 needs to be further rotated in the film winding direction 50 via the thumbwheel 44 to position the next-to-be-exposed frame of the filmstrip 26 at the backframe opening 40.

Figure 9:
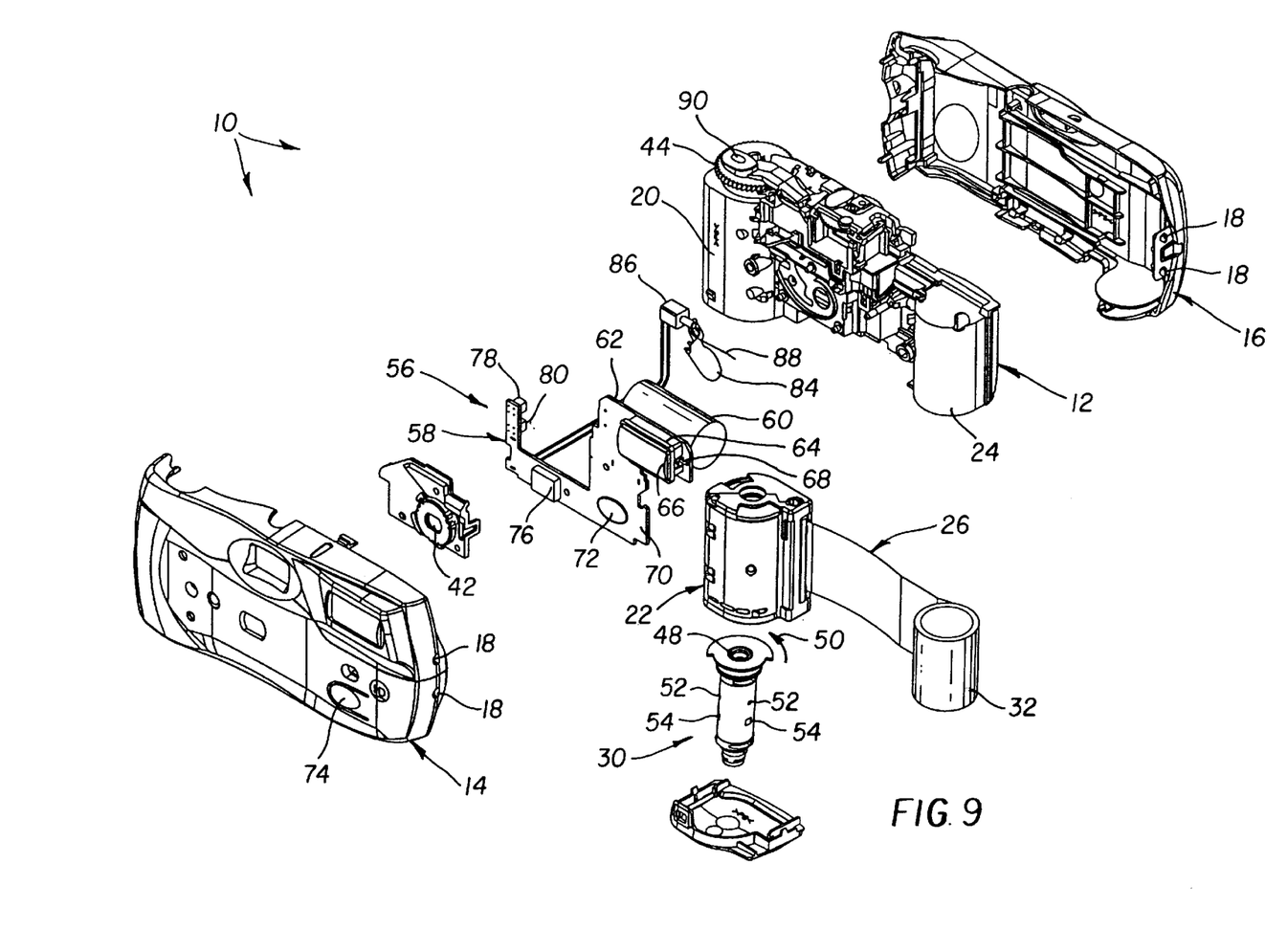
FIG. 9 is an exploded front perspective view of a one-time-use camera which is an alternative embodiment of the invention.
Figure 10:
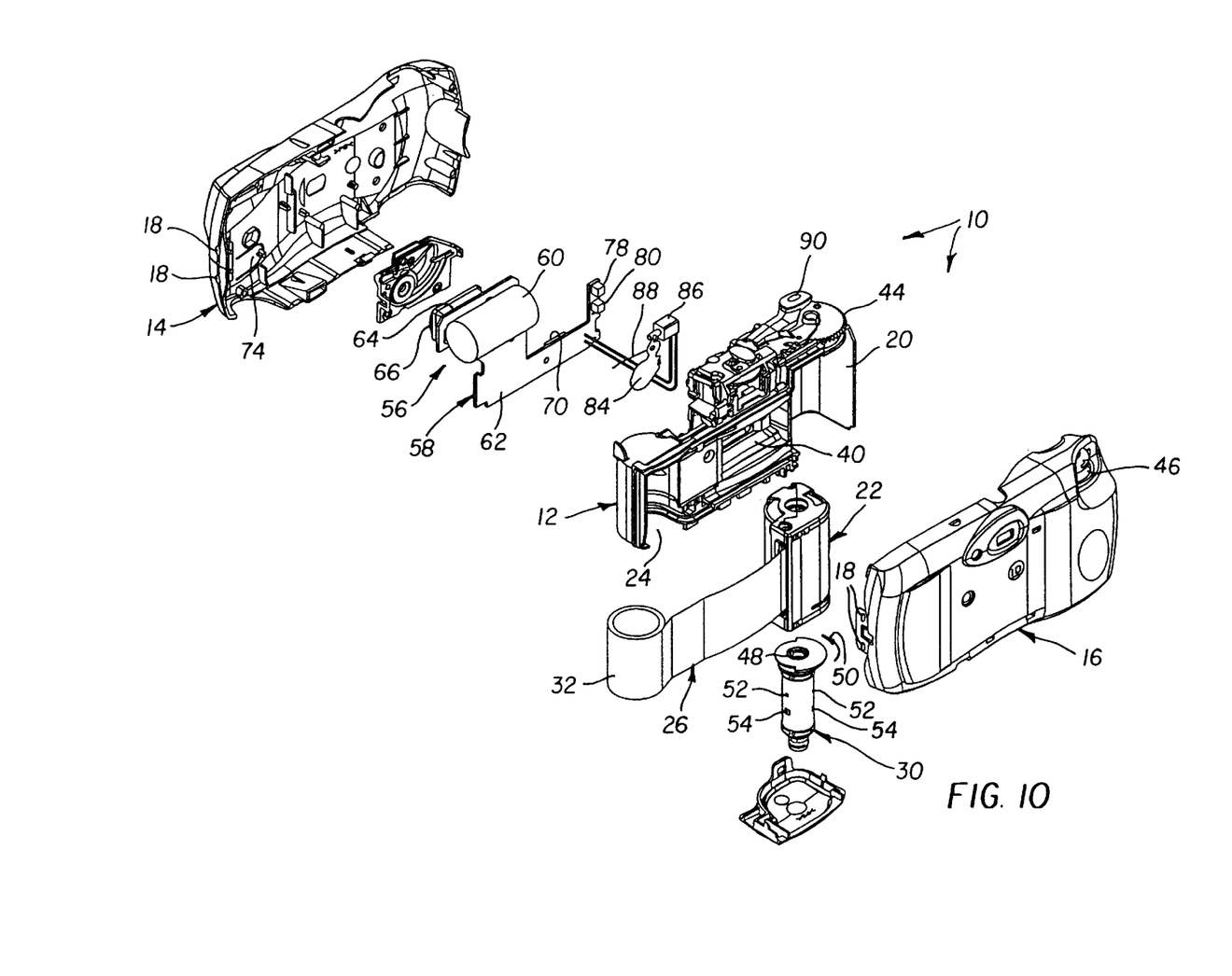
FIG. 10 is an exploded rear perspective view of the camera.
Figure 11:
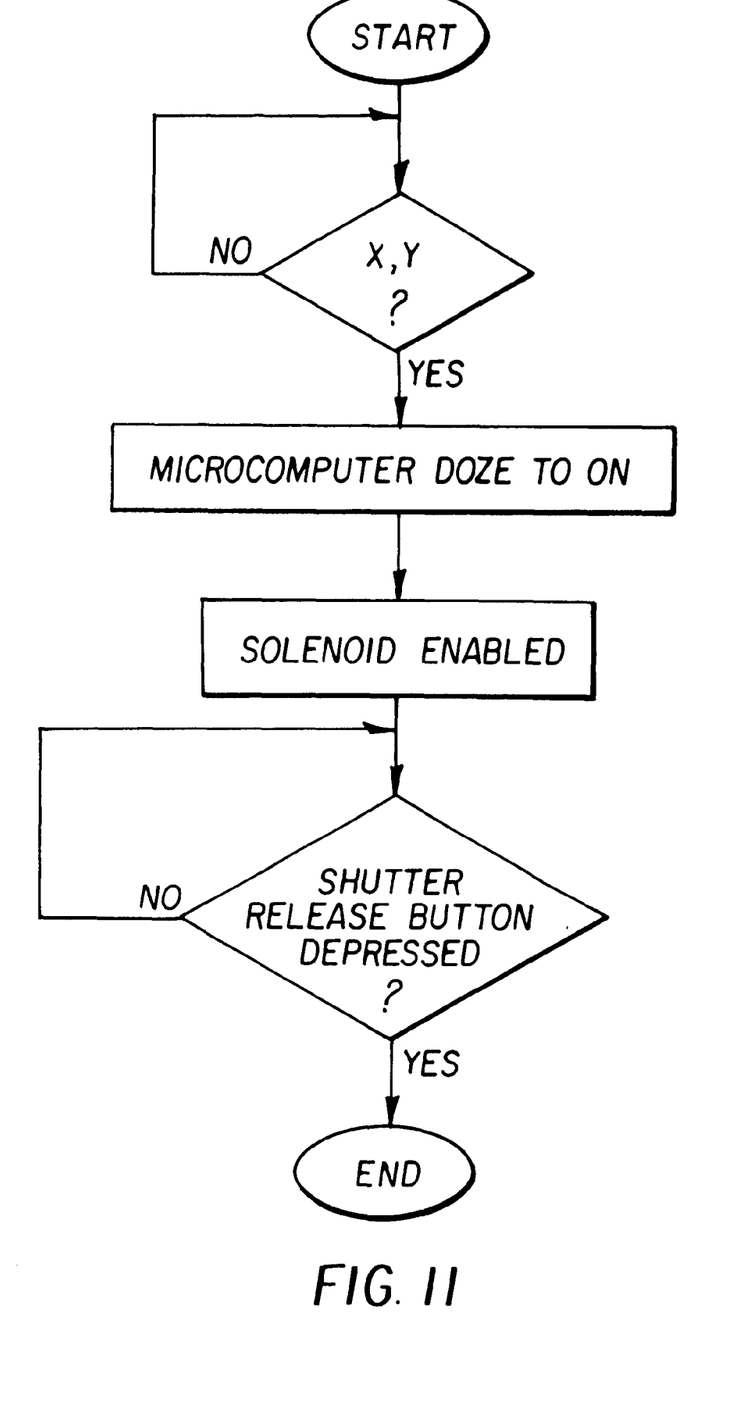
FIG. 11 is a flow chart

Alternative Embodiment (FIGS. 9–11)

FIGS. 9–11 show an alternative embodiment of the one-time-use camera 10 which differs from the preferred embodiment of the camera in FIGS. 1–8 in that an electronic shutter 82 is enabled instead of (or in addition to) the electronic flash 56. The electronic shutter 82 includes a pivotal shutter blade 84 that is pivoted open to make an exposure and closed to terminate the exposure, a solenoid 86 that must be enabled to pivot the shutter blade open, and a return spring 88 for pivoting the shutter blade closed. The solenoid 86 is connected with the microcomputer 76.

Operation

A flow chart depicting a method of enabling the electronic shutter 82 is shown in FIG. 11. In this instance, the filmstrip 26 has 40 frames available for exposure.

When the film take-up spool 30 is rotated in the film winding direction 50 via the thumbwheel 44, and the upper magnet detector 78 senses a first one of the upper smaller magnetic segments 52, the upper magnet detector provides a first input to the microcomputer 76 which registers that input as a "X" value. Simultaneously, the lower magnet detector 80 senses a first one of the lower larger magnetic segments 54, and it provides a first input to the microcomputer 76 which registers that input as a "Y" value.

The microcomputer 76 then changes from its "doze" mode to its "on" or "active" mode, and enables the solenoid 86.

When the microcomputer 76 enables the solenoid 86, the film take-up spool 30 has been rotated an angle of rotation that cannot be greater than (i.e. it actually is substantially less than) the "minimum" angle necessary to wind the last-to-be exposed frame 36 onto the spool, because the upper magnet detector 78 has sensed only a first one of the three upper smaller magnetic segments 52 and the lower magnet detector 80 has sensed only a first one of the three lower larger magnetic segments 54. The "minimum" angle is 220°, and the angle of rotation necessary for the respective magnet detectors 78 and 80 to sense the first ones of the three magnetic segments 52 and 54 cannot be more than 120°. (The angle of rotation necessary for the respective magnet detectors 78 and 80 to sense the first ones of the three magnetic segments 52 and 54 varies in accordance with the relative positions of the magnet detectors 78 and 80 and the first ones of the magnetic segments 52 and 54 at the start of rotation of the film take-up spool 30 in the film winding direction 50.) Thus, the film take-up spool 30 needs to be further rotated in the film winding direction 50 via the thumbwheel 44 to position the next-to-be-exposed frame of the filmstrip 26 at the backframe opening 40. The respective magnet detectors 78 and 80 will then sense further ones of the three magnetic segments 52 and 54, but this has no affect on the electronic flash 56 (which is already enabled).

When a shutter release button 90 is manually depressed to initiate making an exposure, a known shutter release switch (not shown) connected to the microcomputer 76 is immediately closed. The microcomputer 76 then momentarily activates the solenoid 88 to pivot the shutter blade 84 open. The return spring 88 then pivots the shutter blade 84 closed. The solenoid 88 is thereby disabled.

The invention has been described with reference to a preferred embodiment. However, it will be appreciated that variations and modifications can be effected by a person of ordinary skill in the art without departing from the scope of the invention.

| PARTS LIST | |
|---|---|
| 10. | one-time-use camera |
| 12. | main body part |
| 14. | front cover part |
| 16. | rear cover part |
| 18. | hook-in-hole connections |
| 20. | cartridge receiving chamber |
| 22. | film cartridge |
| 24. | film supply chamber |
| 26. | filmstrip |
| 28. | trailing end portion |
| 30. | film take-up spool |
| 32. | unexposed film roll |
| 34. | first-to-be-exposed frame |
| 36. | last-to-be-exposed frame |
| 38. | pre-exposure frame |
| 40. | backframe opening |
| 42. | taking lens |
| 44. | thumbwheel |
| 46. | narrow opening |
| 48. | exposed top end |
| 50. | film winding direction |
| 52. | upper smaller magnetic detectable segments |
| 54. | lower larger magnetic detectable segments |
| 56. | electronic flash |
| 58. | flash circuit board |
| 60. | flash capacitor |
| 62. | rear side |
| 64. | flash reflector |
| 66. | flash cover lens |
| 68. | flash tube |
| 70. | front side |
| 72. | flash charge button |
| 74. | cantilevered button |
| 76. | microcomputer |
| 78. | upper magnet detector |
| 80. | lower magnet detector |
| 82. | electronic shutter |
| 84. | shutter blade |
| 86. | solenoid |

-continued

PARTS LIST

| 88. | return spring |
| 90. | shutter release button |

What is claimed is:

1. A one-time use camera comprising a filmstrip having successive frames including first- and last-to-be-exposed frames and a pre-exposure frame immediately preceding said first-to-be-exposed frame, a backframe opening at which the respective frames of said filmstrip beginning with said first-to-be exposed frame and ending with said last-to-be-exposed frame are exposed during picture-taking, a film cartridge which contains a film take-up spool that is manually rotated decreasing angles of rotation to wind the respective frames of said filmstrip beginning with said pre-exposure frame from said backframe opening onto said spool, and an exposure-related component that must be enabled in order to operate, is characterized in that:

a rotation-sensing detector for sensing rotation of said spool is connected with said exposure-related component to enable the exposure-related component when the spool is rotated an angle of rotation no greater than an angle sufficient to wind said last-to-be exposed frame onto said spool, whereby said exposure-related component can be enabled each time said spool is rotated to wind one of said frames of the filmstrip onto the spool.

2. A one-time-use camera as recited in claim 1, wherein said rotation-sensing detector enables said exposure-related component when the spool is rotated an angle of rotation less than said angle sufficient to wind said last-to-be exposed frame onto said spool.

3. A one-time-use camera as recited in claim 1, wherein said film take-up spool includes a plurality of detectable segments that are arranged for said rotation-sensing detector to sense said segments as the spool is rotated, and said rotation-sensing detector enables said exposure-related component when the detector senses a constant invariable number of said detectable segments which is less than the total number of the detectable elements.

4. A one-time-use camera as recited in claim 3, wherein the constant invariable number is at least one ("1") less than the total number of said detectable elements.

5. A one-time-use camera as recited in claim 3, wherein the constant invariable number is no more than two ("2") less than the total number of said detectable elements.

6. A one-time-use camera as recited in claim 1, wherein said film take-up spool includes three detectable segments that are arranged 120° apart from one another for said rotation-sensing detector to sense said segments as the spool is rotated.

7. A one-time-use camera as recited in claim 6, wherein said rotation-sensing detector enables said exposure-related component when the detector senses no more than two ("2") of said detectable segments.

8. A one-time-use camera as recited in claim 1, wherein said exposure-related component is an electronic flash that must be enabled to provide flash illumination.

9. A one-time-use camera as recited in claim 8, wherein said electronic flash includes a flash circuit board that is encapsulated, and said rotation-responsive detector is mounted on said flash circuit to be encapsulated with the circuit board.

10. A one-time-use camera as recited in claim 1, wherein said exposure-related component is an electronically operated shutter.

11. A one-time-use camera as recited in claim 10, wherein said electronically operated shutter includes a pivotal shutter blade and a solenoid that must be enabled to pivot said shutter blade.

12. A one-time-use camera as recited in claim 1, wherein said angle sufficient to wind said last-to-be exposed frame onto said spool is less than 360°, and an angle sufficient to wind said pre-exposure frame onto said spool is greater than 360°.

13. A one-time-use camera as recited in claim 12, wherein said film take-up spool includes three detectable segments that are arranged 120° apart from one another for said rotation-sensing detector to sense said segments as the spool is rotated, and said rotation-sensing detector enables said exposure-related component when the detector senses no more than two ("2") of said detectable segments.

14. A one-time use camera comprising a filmstrip having successive frames, a backframe opening at which the respective frames of said filmstrip are exposed during picture-taking, a film cartridge which contains a film take-up spool that is manually rotated decreasing angles of rotation to wind the respective frames of said filmstrip onto said spool, and an exposure-related component that must be enabled in order to operate, is characterized in that:

said film take-up spool includes a plurality of detectable segments that are similarly spaced apart from one another to be sensed as the spool is rotated; and a rotation-sensing detector for sensing said detectable segments is connected with said exposure-related component to enable the exposure-related component when said rotation-sensing detector senses a constant invariable number of the detectable segments which is less than the total number of the detectable elements.

15. A one-time-use camera as recited in claim 14, wherein the constant invariable number is at least one ("1") less than the total number of said detectable elements.

16. A method in a one-time-use camera of enabling an exposure-related component to permit operation of that component, comprises the steps:

rotating a film take-up spool similarly decreasing angles of rotation after each exposure is made to incrementally wind successive exposed frames of a filmstrip beginning with a first-to-be exposed frame and ending with a last-to-be-exposed frame onto the spool; and enabling the exposure-related component when the spool has rotated an angle of rotation no greater than a minimum angle sufficient to wind the last-to-be-exposed frame onto the spool, whereby the exposure-related component can be enabled each time the spool is rotated to wind one of the exposed frames onto the spool.

17. A method as recited in claim 16, wherein the exposure-related component is enabled when the spool is rotated an angle of rotation less than the minimum angle sufficient to wind the last-to-be exposed frame onto the spool.

18. A method as recited in claim 16, wherein said step of enabling includes sensing a constant invariable number of detectable elements on the film take-up spool which is less than a total number of the detectable elements on the spool when the spool is rotated an angle of rotation no greater than the minimum angle.

* * * * *